United States Patent Office 2,697,029
Patented Dec. 14, 1954

2,697,029

METHODS OF PRODUCING CARBONIZED SUBSTANCES CONTAINING SILICON

William O. Baker, Morristown, Richard O. Grisdale, Short Hills, and Field H. Winslow, Springdale, N. J., assignors to Bell Telephone Laboratories, Incorporated, New York, N. Y., a corporation of New York No Drawing. Application April 28, 1951, Serial No. 223,634

10 Claims. (Cl. 23—209.1)

This invention relates to methods of forming thermally dehydrogenated products of certain relatively high molecular weight, highly cross-linked polymers containing hydrogen, carbon and silicon and to the products so produced.

These polymers can be formed in any desired physical shape by polymerization of lower molecular weight materials and are then subjected to elevated temperatures at which dehydrogenation occurs without destruction of its physical shape. By limiting the temperature to which the polymer is heated or the time of heating and thus controlling the degree of dehydrogenation or by forming the polymer with varying proportions of carbon and silicon, a wide variety of dehydrogenation products having useful properties can be produced.

The most useful products are produced when the dehydrogenation is continued until the hydrogen content of the product is less than 5 per cent by weight of the carbon content. The silicon content of the product will ordinarily vary between about 0.1 per cent and 20 per cent by weight of the product. With hydrogen contents between about 5 per cent and about 1 per cent of the carbon, the products exhibit photoconductivity and are useful in the manufacture of devices such as radiation counters. The products capable of widest application are those which are highly dehydrogenated, which contain, for instance, not more than 1 per cent hydrogen and preferably not more than 0.5 per cent hydrogen based on the weight of the carbon. These are lustrous, black, hard, strong, coherent substances having electrical resistivities at 25° C. varying from about $10^{-2}$ ohm-centimeters for the products of lowest hydrogen and silicon contents to very high values (above $10^7$ ohm-centimeters) for the highest hydrogen and silicon contents.

It is in connection with the production of bodies of these highly dehydrogenated substances that the invention will first be described. These highly dehydrogenated substances are useful for a variety of purposes. Their electrical properties, and their ability to be formed as continuous, homogeneous substances in any desired shape, adapt them particularly for forming microphone granules, electrical resistance coatings on non-conductive refractory bases, electrical contact surfaces on ceramics or metal bodies, incandescent lamp filaments and a variety of similar objects. Their extreme hardness adapts them to be used for abrasive purposes in the form of sharp-edged particles. Other desirable uses will be apparent from the description below.

Preferably the polymers from which the dehydrogenated products are formed consist substantially entirely of carbon, hydrogen and silicon. The polymers may be formed by the polymerization of any monomer which possesses the requisite degree of non-benzenoid carbon-to-carbon unsaturation and the molecules of which are formed of at least one silicon atom bonded to at least one hydrocarbon chain containing olefinic or acetylenic unsaturation.

The monomer or monomer mixture must possess sufficient unsaturation to produce a polymer which is adequately cross-linked to prevent excessive formation of volatile products during dehydrogenation. In the absence of adequate cross-linking in the polymer, it may be converted completely or substantially completely to low molecular weight products which are lost by volatilization so that little or no residue of carbon and silicon remains.

The unsaturation in the monomer, which determines the degree of cross-linking which the polymer can achieve, can be expressed in terms of functionality, with each olefinic double bond in the molecule contributing a functionality of two and each acetylenic triple bond contributing a functionality of four. If the cross-linking in the polymer is sufficiently great, as when it is formed from a monomer material containing at least 50 per cent by weight of at least one monomer having a functionality of at least 6, a body of the polymer can be subjected directly to pyrolytic dehydrogenation by heating in a non-oxidizing atmosphere and will yield a solid, coherent body of the same shape which contains from 30 per cent to 50 per cent or more of the carbon originally present in the polymer and a somewhat higher percentage of the silicon originally present.

When the polymer is formed of a monomer or monomer mixture of lower functionality, it will not be sufficiently cross-linked to give such a high yield upon pyrolysis. When bodies of such a polymer are heated in a non-oxidizing atmosphere, they may leave no residue at all or, at best, they may leave no more than about 10 per cent of the carbon originally present in the polymer. If there is a residue in such a case, the residue may retain the original form of the polymer body and may be a hollow shell.

If the average functionality of the monomer or monomer mixture from which the polymer is formed is at least 2.4, the yield of the carbon-silicon residue can be increased substantially by heating the polymer in air or other oxygen-containing atmosphere, prior to pyrolytic dehydrogenation, to temperatures between 200° C. and 300° C. and preferably about 250° C. The average functionality of a monomer mixture is computed by multiplying the mol fraction of each monomer in the mixture by the functionality of the monomer and adding the products thus obtained. Although it is possible to obtain a small but substantial increase in the yield of carbon-silicon residue by air-baking at these temperatures for as little as two hours, more substantial increases in yield are obtained if the baking is continued for at least four hours. For the greatest increase in yield, the baking is continued for longer periods of, for instance, twenty-four hours or one week or even two weeks. As the yield of the residue is increased, the density of the resulting bodies is increased.

By this air-baking procedure, solid carbon-silicon bodies in yields of 50 per cent or more of the original weight of the polymer can be obtained upon the pyrolysis of polymers which, in the absence of preliminary air-baking, would give yields of not more than 10 per cent. The preliminary air-baking can also be used to increase the yield of carbon-silicon residue from the highly cross-linked polymers formed from polymerizable material containing monomers having a functionality of at least 6. However, the proportional increase in yield due to air-baking decreases as the initial cross-linking of the polymer increases and is not great for the very highly cross-linked polymers. A similar increase in yield can be obtained by a preliminary baking under the same conditions in certain atmospheres other than air, such as ammonia, nitric oxide, hydrogen sulfide, sulfur dioxide or methyl amine.

A polymer is sufficiently cross-linked to yield a substantial residue upon pyrolysis, after air-baking, if a body of the polymer does not swell to more than five times its original volume, and preferably not more than 1.25 times its original volume in a thermodynamically inert solvent (having no substantial heat of solution), such as benzene or carbon tetrachloride.

As examples of monomers which may be used alone, or in mixture with each other or with polymerizable hydrocarbons, may be mentioned the polyallyl silanes, such as tetraallyl silane with a functionality of 8, methyl triallyl silane with a functionality of 6 or dimethyl diallyl silane with a functionality of 4, and the silyl styrenes, such as trimethyl silyl styrene and triethyl silyl styrene both of which have a functionality of 2.

The silyl styrenes can be prepared from the corresponding silyl phenyl magnesium halides by reaction with acetaldehyde to yield silylated phenyl α-substituted carbinols with subsequent catalytic dehydration of the carbinols over activated alumina at a temperature of about 300° C. to form the silyl styrenes, as described more fully in the copending application of F. H. Winslow, Serial No. 223,640, filed on the same day as the present application, now Patent No. 2,642,415, issued June 16, 1953.

When a silyl styrene with a functionality of 2 is used, it must be copolymerized with a sufficient amount, at least 20 per cent and preferably 30 per cent or more, of a substance of a functionality of at least 4, such as divinyl benzene, trivinyl benzene, vinyl acetylene, divinyl acetylene, divinyl naphthalene, vinyl butadienyl acetylene or any of the polyallyl silanes referred to above, to produce the minimum average functionality required for a substantial yield upon pyrolysis, after preliminary air-baking. If the silyl styrene is copolymerized with at least 50 per cent of a monomer having a functionality of at least 6, such as trivinyl benzene, a high yield can be obtained without air-baking.

A desirable product for electrical use was prepared by the pyrolysis of spheres of a copolymer of 10 parts by weight of trimethyl silyl styrene with 50 parts of divinyl benzene and 40 parts of ethyl vinyl benzene. After air-baking at 250° C. for 16 hours followed by dehydrogenation in nitrogen at temperatures progressively increased to 960° C., a product containing 1.2 per cent silicon and having an electrical restivity of 0.1 ohm-centimeter when produced.

When a silicon-containing monomer is used which has a functionality sufficiently greater than the minimum required for a good yield, it may be copolymerized with any hydrocarbon monomer having a functionality of at least 2, such as any of those referred to above as copolymerizable with the silyl styrenes, as well as styrene, methyl styrene, ethyl styrene, acetylene, phenyl acetylene, stilbene, indene, vinyl naphthalene or fluorene.

The relative proportions of carbon and silicon in the dehydrogenated product can be controlled by selection of a monomer from among the various monomers containing different carbon-to-silicon ratios or by mixing, in varying proportions, two or more sicilon-containing monomers having different carbon-to-silicon ratios or by mixing, in varying proportions, a silicon-containing monomer and a hydrocarbon monomer.

The monomer or monomer mixture can be polymerized by procedures known in the art. Thus, polymerization is conveniently accomplished by adding 1 per cent of benzoyl peroxide to the material to be polymerized and then heating it to a temperature at which polymerization occurs at a practical rate, as for instance at temperatures between 60° C. and 150° C. As is known in the art, polymerization can be accomplished with larger or smaller amounts of benzoyl peroxide, as for instance between 0.5 per cent and 4 per cent, and with other peroxide or hydroperoxide catalysts.

The shaping of the material which is polymerized can be accomplished in a variety of ways. One of the most useful forms of the carbon-silicon residue which is ultimately produced is in the shape of small spheres. Spherical polymer shapes, from which such carbon-silicon spheres can be produced, can be formed by the so-called pearl or bead polymerization. The silyl styrenes, copolymerized with other polymerizable materials of higher functionality, are particularly suited to polymerization by this process, as are the polyallyl silanes when copolymerized with at least 20 per cent by weight of a polyvinyl benzene, such as divinyl benzene or trivinyl benzene.

In the formation of polymer spheres by this method, the material to be polymerized is agitated, as by rapid stirring, together with a body of a non-solvent suspension liquid, such as water. Under the influence of the continuing agitation, the material to be polymerized breaks up into spherical globules dispersed in the suspension liquid. The entire system is maintained at a polymerizing temperature until rigid, non-tacky polymer spheres are produced. The polymerization in suspension can be continued until the requisite degree of cross-linking, as set forth above, has been achieved or the polymer spheres can be removed from the suspension after they have become rigid and non-tacky and can be subsequently heated to complete their polymerization.

The manner in which a partial yield of polymer spheres of mixed sizes can be produced by this method is known to the art. A procedure by which high yields of spheres falling within a narrow size range can be produced is described and claimed in the copending application of F. H. Winslow, Serial No. 182,309, filed August 30, 1950.

According to this procedure, a liquid mass of material to be polymerized, which contains a polymerization catalyst, is rapidly stirred by a rotary stirrer into suspension in at least five times as much by volume, and preferably ten to fifteen times as much by volume, of water or an aqueous solution of an inorganic salt, the pH of which is maintained at a value between 3 and 7 and which has dissolved in it between 0.25 per cent and 5 per cent, and preferably about 2 per cent, of a suspension stabilizing agent comprising polyvinyl alcohol having a degree of hydrolysis of at least 95 per cent and preferably at least 98 per cent and having an intrinsic viscosity in aqueous solution of between 0.3 and 0.9. The temperature of the system is maintained between about 60° C. and 100° C., and preferably between about 75° C. and 85° C., until the suspended spheres have polymerized to a rigid, non-tacky state.

In this process, an increase in the rate of agitation and an increase in the concentration of the polyvinyl alcohol in the aqueous suspension medium tend to decrease the size of the spherical polymer particles which are produced. Similarly, the use of polyvinyl alcohols of decreasing degrees of hydrolysis or of increasing intrinsic viscosities tends to decrease the size of the spheres. With polyvinyl alcohols having degrees of hydrolysis and intrinsic viscosities falling within the range set forth above, a high yield of unagglomerated spheres, the greater proportion of which have a diameter falling within a narrow range of size distribution, can be obtained with average diameters lying between .05 millimeter and 1.5 millimeters. Larger spheres can be obtained in lower yield by decreased agitation and lower concentrations of polyvinyl alcohol, particularly when the lower viscosity grades of polyvinyl alcohol are used. When it is desired to produce spheres of smaller diameter, down to .005 millimeter for instance, a polyvinyl alcohol of lower degree of hydrolysis, for instance about 77 per cent, and a higher intrinsic viscosity, for instance about 1.0, may be used.

As indicated above, the spheres obtained in this process may either be fully polymerized to the requisite degree of cross-linking for subsequent pretreatment and pyrolysis or be brought to this degree of cross-linking by subsequent heating after removal from suspension. The fraction of the polymerized material which is removed from suspension as agglomerated spheres, rather than individual spheres, can be treated in the same manner to produce agglomerated carbon spheres useful for some purposes.

In a similar manner, carbon rods or filaments of various diameters can be produced according to the process of the present invention by first forming polymer rods or filaments. The formation of such polymer rods or filaments can conveniently be accomplished by inserting the monomer or monomer mixture, containing the requisite polymerization catalyst, in a glass capillary tube of the desired diameter and gradually moving the tube longitudinally into a zone in which a polymerizing temperature is maintained, so that the monomer polymerizes gradually from one end of the tube to the other. This method of polymerization minimizes cracking from the large volume shrinkage during polymerization. After the polymer has achieved the required degree of cross-linking, it can be removed from the tube, as by breaking away the tube or dissolving it or by other means. The resulting polymer rod or filament can be converted to carbon-silicon rods or filaments by the process of the present invention. This method of polymerization is also particularly adapted to the formation of polymers from vinyl aromatic compounds, particularly from trivinyl benzene or divinyl benzene or mixtures of these substances with each other or with other polymerizable materials, particularly mono-vinyl benzenes.

The process of the present invention can also be used for forming an adherent carbon film on various surfaces. This is accomplished by forming a film of the hydrocarbon to be pyrolyzed and converting the film to carbon. The film can be formed on the surface of any material sufficiently stable and refractory to be subjected to the temperatures required for pyrolysis, such as ceramics, glasses, crystals, or metals having melting points substantially above the temperatures of pyrolysis. The coatings can be applied to rods, wires, spheres, tubes (both internally and externally) and other complex forms which it is difficult or impossible to cover with a coherent carbon layer by gas phase pyrolysis.

The polymer films which are to be converted to carbon-silicon films can be deposited in any convenient manner. Thus any of the liquid monomers or monomer mixtures referred to above, containing a polymerization catalyst, can be coated on the surface and then maintained at a polymerizing temperature until a polymer of the required degree of cross-linking has been produced. Similarly, the monomer or a partially polymerized material which is still soluble may be dissolved in a volatile solvent, the solution may be coated on the surface, the solvent may be allowed to evaporate and the monomer or partially polymerized material may be further polymerized. This polymer film can be subject to an air-baking pretreatment, if required, or its equivalent and then to pyrolysis.

The pyrolysis of the polymer is carried out in a non-oxidizing, non-reactive atmosphere, at least during all portions of the operation at which the temperature is above 300° C., and preferably throughout the entire operation, in order to prevent loss of the material by oxidation. Particularly suitable atmospheres are helium, hydrogen or a sufficiently high vacuum.

The polymer bodies are brought gradually to the maximum temperature of pyrolysis so as to allow the gradual release of the gases which are developed and thus prevent destruction of the bodies. It has been found that a temperature rise of about 200° C. per hour between about 300° C. and the maximum temperature yields desirable results. Obviously the bodies may be heated more slowly if desired, as for instance at an average rate of about 5° C. per hour. A more rapid rate of heating, up to about 500° C. per hour, may also be used. It is apparent that, although the temperature increase can be made continuous, it is more readily brought about by stepwise increases, for instance of the order of 25° C. to 100° C. apart.

The residual amount of hydrogen remaining in the final carbon-silicon product is dependent upon the maximum temperature to which the bodies are brought during pyrolysis for a substantial period of time. A product in which the hydrogen is present in an amount not greater than 1 per cent by weight of the carbon can be produced by carrying the pyrolytic temperature to 850° C. and maintaining the material at this temperature for one-half hour or more.

The use of higher ultimate pyrolyzing temperatures results in lower hydrogen contents. Products containing not more than 0.4 to 0.5 per cent hydrogen, based on the weight of the carbon, can be produced by the use of a final pyrolytic temperature of 1000° C., whereas hydrogen contents of not more than 0.25 per cent and 0.1 per cent can be produced by the use of pyrolytic temperatures of, respectively, 1100° C. and between 1200° C. and 1300° C.

As stated above, products can be produced having electrical resistivities varying over a wide range by varying the hydrogen and silicon contents. The products are extremely hard.

Bodies of the carbon-silicon product also display intense sorptive capacity, quickly taking up helium, nitrogen, oxygen, water vapor and other gases when exposed to the atmosphere. The surfaces of these bodies exhibit an unusual smoothness. Electron micrographs of surface replicas of these surfaces at magnifications up to 14,000 show an essentially smooth surface with occasional small craters but with substantially no outward projections. The absolute density of the carbon-silicon is somewhat greater than 2. A comparison of the absolute volume of the carbon in the bodies with the apparent volume of the bodies shows that the carbon occupies in the vicinity of one-half the apparent volume, the remainder being made up of pores of exceptional fineness.

Because of this surface smoothness and freedom from outward projections, and because of the high sphericity obtainable in the production of polymer carbon-silicon spheres by the methods described above, masses of these spheres possess an exceptionally high fluidity. This fluidity can be measured by the angle of repose of a mass of the spheres. The cotangent of the angle of repose has been measured as about 2.15.

When used as microphone granules in carbon type microphones, carbon-silicon bodies produced as described above have been found to exhibit exceptionally high modulation efficiency. The modulation is measured as the ratio of the change in resistance of a mass of granules to the average agitated resistance of the mass, when the mass is subjected to cyclical mechanical compression of a chosen frequency and amplitude. When measured in an enclosed vessel having one movable wall which oscillated at a frequency of 1000 cycles per second and with an amplitude of several hundred angstroms, carbon-silicon spheres, having diameters lying between about .25 millimeter and about .3 millimeter, were found to have a modulation of about 33 per cent as compared with a modulation of 13 per cent for anthracite granules and about 17 per cent for quartz spheres coated with pyrolytic carbon deposited from a hydrocarbon in the gas phase. Even higher modulations can be obtained with mixtures of carbon-silicon spheres and sphere agglomerates, of the same particle size, mixed in proportions such as to reduce the fluidity of the mass so that the cotangent of its angle of repose is 1.3, or close to the average fluidity of anthracite microphone granules. Microphone granules of this type are more particularly described and claimed in the copending application of W. O. Baker and R. O. Grisdale, Serial No. 223,635, filed on the same day as the present application.

Another advantage of the carbon-silicon spheres or sphere-aggregate mixtures for microphonic purposes lies in the fact that the density of the particles lies within the desirable range for such use and can be varied to produce the density value most suitable for a particular microphone design. Thus the apparent density of the particles, which is equal to the weight of the particle divided by the volume of the envelope of the particle, can be varied between a value of about 1 gram per cubic centimeter and about 1.6 grams per cubic centimeter by selection of the proper polymer and by controlling the degree of preliminary air-baking or other inhibiting pretreatment. The apparent density can be determined by weighing the particles and then determining the envelop volume by determining the displacement by the particles of a liquid, such as alcohol, xylene or mercury, which does not wet the pores of the particles. The bulk density of a mass of the particles can be varied between about 0.6 gram per centimeter and 1.0 or 1.2 grams per centimeter by control of the factors referred above as well as by control of the particle size and particle size distribution in the mass.

A further advantage lies in the fact that the resistance of the material can be adjusted to an optimum value for any particular microphone design, without affecting the modulation efficiency, by varying the silicon content. This controllable resistance, controllable density and controllable fluidity considerably widen design potentialities for microphones in which the carbon-silicon particles are to be used. These advantages are present whether the inherently good modulation of the carbon-silicon surfaces is used or the carbon-silicon granules are subsequently coated with a layer of pyrolytic carbon deposited from the gas phase.

In the formation of the carbon-silicon spheres for microphonic use, it has been found that the presence of even minute amounts of oxygen and water vapor in the atmosphere during pyrolysis strongly affects the microphonic properties of the resulting carbon. The material is particularly sensitive to oxygen and water vapor during the final phase of the pyrolysis at temperatures from about 950° C. and 1200° C.

The effect of oxygen or water vapor during pyrolysis has been found to be the production of a thin layer of higher conductivity material on the surface of the particles. This higher conductivity layer increases substantially the effective electrical contact between particles for a given mechanical contact and thus results in a reduction in the modulation.

Therefore, in order to achieve the best microphonic properties with satisfactory reproductibility, it is necessary to insure the exclusion of all oxygen and water vapor from the atmosphere of the pyrolytic furnace and to take extraordinary precautions to assure gas-tight furnace connections. When a gas containing small amounts of oxygen and water vapor is used to sweep the gaseous pyrolytic products from the furnace, it can be freed of oxygen and water vapor prior to its introduction into the furnace by adding about 15 per cent hydrogen (if the gas is not originally hydrogen) and passing the mixture first through a palladium catalyst and then through a drying tower filled with granulas calcium hydride.

The unique properties of the carbon-silicon spheres, and bodies of other shape, adapt them to a variety of other uses. The perfect sphericity of the spheres, coupled with their smoothness, hardness and availability in a variety of small sizes, make them well suited for forming ball bearings for instruments, watches and other delicate machinery. A coating can be applied to the spheres for this use to impart permanent lubricating qualities.

Masses of carbon-silicon spheres can be used as adsorbents for use with gaseous or liquid media. They can be used as filter beds and as catalytic materials. They can be used for forming chromatographic columns. The change in contact resistance between the spheres in the presence of certain gases makes them useful as electrical gas detectors.

The outstanding stability of the spheres at very high temperatures and their high fluidity suits them very well for use as flowing heat transfer media.

Filaments of carbon-silicon are useful as electrical resistance elements and as incandescent lamp filaments. For these uses, filaments of polymer can be coiled to the required shape, about a base if necessary, prior to pyrolysis.

Refractory bodies coated with films of carbon-silicon can be used for electrical resistors. The method of the present invention lends itself well to the formation of resistors in printed circuits. Microphone granules can be prepared by forming films of carbon-silicon on spheres or quartz or other refractory material. Carbon-silicon bodies, as well as films of these materials on ceramic or metal bodies, form excellent electrical contact surfaces for electrical switches.

The extreme hardness of the carbon-silicon of the present invention makes it useful as an abrasive. The abrasive properties can be utilized by forming sharp-edged particles, as by the crushing of spheres or other shapes or by scraping flakes of a carbon-silicon film from a base on which it is formed. These particles can be used as a substitute for diamond dust for some purposes and can be formed, with conventional binders, into abrasive-coated papers and fabrics, grinding wheels or similar devices.

Similar flakes which are exceedingly thin and of small particle size can be used as fillers or pigments for plastics, paints and rubbers in place of carbon. Due to their flake form, these particles are exceptionally effective in forming a light screen to protect the plastic or rubber from deterioration and they have good hiding power when used in paints. Where electrically conductive plastic or rubber compositions are desired, particularly effective fillers are formed from thin filaments of carbon-silicon which break up to form thin rods of small particle size. The shape of these particles is such as to maintain effective electrical contact between them when they are present in sufficient concentration.

The description above has been concerned primarily with the foramtion of carbon-silicon bodies which have been dehydrogenated to a hydrogen content not exceeding 1 per cent hydrogen, based on the weight of the carbon, by heating to temperatures above 850° C. However, as indicated above, products with useful, though different, properties are obtained with lesser degrees of dehydrogenation (between 1 per cent and 5 per cent hydrogen) by heating at lower temperatures.

Within this later range of dehydrogenation the materials develop photoconductive properties and, as indicated above, are useful for forming photoconductive devices such as radiation counters. Materials falling within this range of dehydrogenation also exhibit large negative temperature coefficients of resistivity and are useful for forming thermistors and varistors. These materials are prepared by the same techniques as described above in connection with the preparation of the more highly dehydrogenated materials, except that the final pyrolysis is carried out at a lower ultimate temperature at which the amount of hydrogen remaining in the product falls within the ranges set forth above. These temperatures will vary between 400° C. and 850° C. depending upon the degree of dehydrogenation desired and the nature of the original polymer.

The invention has been described in terms of its specific embodiments and, since certain modifications and equivalents may be apparent to those skilled in the art, this description is intended to be illustrative of, but not necessarily to constitute a limitation upon, the scope of the invention.

What is claimed is:

1. The method which comprises forming a body of a polymer by subjecting to addition polymerization, through unsaturated carbon-to-carbon bonds, a polymerizable material consisting of at least one monomer containing non-benzenoid unsaturated carbon-to-carbon bonds, said polymerizable material having an average functionality in addition polymerization of at least 2.4, said polymerizable material consisting entirely of carbon, hydrogen and silicon, the silicon being present in an amount up to 20 per cent by weight of the carbon, the hydrogen being present in an amount greater than 5 per cent by weight of the carbon, heating said body in an oxygen-containing atmosphere at a temperature between 200° C. and 300° C. for at least two hours and then thermally dehydrogenating said body by heating it in a non-oxidizing atmosphere to a temperature of at least 850° C.

2. The method described in claim 1 wherein the polymerizable material consists of at least one allyl silane containing at least two allyl radicals.

3. The method which comprises forming a polymer body by copolymerizing a silyl styrene with at least 20 per cent by weight of a vinyl benzene containing at least two vinyl radicals, heating said body in an oxygen-containing atmosphere to a temperature between 200° C. and 300° C. for at least two hours, and then thermally dehydrogenating said body by heating it in a non-oxidizing atmosphere to a temperature of at least 850° C.

4. The method described in claim 3 wherein the vinyl benzene is divinyl benzene.

5. The method described in claim 4 wherein the silyl styrene is a trialkyl silyl styrene.

6. The method of forming hard, lustrous, coherent spheres of carbon containing up to 20 per cent by weight of silicon comprising subjecting to addition polymerization, in suspension in a non-solvent liquid medium, a polymerizable material consisting of at least one polymerizable monomer containing non-benzenoid carbon-to-carbon bonds, the constituent elements of said polymerizable material being carbon, hydrogen and an amount of silicon up to 20 per cent based on the weight of the carbon, said polymerizable material having an average functionality in addition polymerization of at least 2.4, separating the resulting polymer spheres from the liquid medium, heating said spheres in air at a temperature of about 250° C. for at least two hours, and thermally dehydrogenating said spheres by heating them in a non-oxidizing atmosphere to a temperature of at least 850° C.

7. The method described in claim 6 wherein the polymerizable material consists of about 10 per cent by weight of trimethyl silyl styrene, about 50 per cent by weight of divinyl benzene and about 40 per cent by weight of ethyl vinyl benzene.

8. The method which comprises forming a polymer body by subjecting to addition polymerization, through unsaturated carbon-to-carbon bonds, a polymerizable material consisting of at least one monomer containing non-benzenoid unsaturated carbon-to-carbon bonds, said polymerizable material having an average functionality in addition polymerization of at least 2.4, said polymerizable material having carbon, hydrogen and silicon as its sole constituents, the silicon being present in an amount up to 20 per cent by weight of the carbon, the hydrogen being present in an amount greater than 5 per cent by weight of the carbon, heating said body in an oxygen-containing atmosphere at a temperature between 200° C. and 300° C. and thermally dehydrogenating said polymer body by heating it in a non-oxidizing atmosphere to a temperature of at least 400° C.

9. The method of forming hard, lustrous, coherent spheres of carbon containing silicon, which method comprises polymerizing, in aqueous suspension, a mixture consisting of at least 50 per cent by weight of trivinyl benzene with the remainder being a silyl styrene, separating the resulting polymer spheres from the suspending medium, baking said spheres in air at a temperature of about 250° C. for at least two hours, and thermally dehydrogenating said spheres by heating them in a non-oxidizing atmosphere to a temperature of at least 850° C. until the hydrogen content of the polymer of which said spheres were formed is reduced to not more than 1 per cent by weight of the carbon remaining in said polymer.

10. The method of forming hard, lustrous, coherent spheres of carbon containing silicon comprising polymerizing a mixture of trivinyl benzene and a silyl styrene in which at least 50 per cent by weight of the mixture is trivinyl benzene while agitating said mixture with an aqueous medium so as to maintain a suspension of globules of said mixture in said medium which globules are converted to suspended polymer spheres upon polymerization, separating the resulting polymer spheres from the suspending medium, and thermally dehydrogenating said spheres by heating them in a non-oxidizing atmosphere to a temperature of at least 850° C.

References Cited in the file of this patent

UNITED STATES PATENTS

| Number | Name | Date |
|---|---|---|
| 801,296 | Bolling | Oct. 10, 1905 |
| 821,017 | Clark | May 22, 1906 |
| 2,108,794 | Boyer et al. | Feb. 22, 1938 |
| 2,448,391 | Pyle | Aug. 31, 1948 |
| 2,502,183 | Swallen | Mar. 28, 1950 |

FOREIGN PATENTS

| Number | Country | Date |
|---|---|---|
| 329,652 | Great Britain | May 21, 1930 |